United States Patent

[11] 3,607,726

[72] Inventor Newt M. Hallman
Mount Prospect, Ill.
[21] Appl. No. 795,123
[22] Filed Jan. 29, 1969
[45] Patented Sept. 21, 1971
[73] Assignee Universal Oil Products Company
Des Plaines, Ill.

[54] RECOVERY OF HYDROGEN
8 Claims, 1 Drawing Fig.
[52] U.S. Cl. .................................................. 208/108,
208/102, 208/103
[51] Int. Cl. .................................................. C10g 13/00
[50] Field of Search ........................................ 208/108;
208/102, 103

[56] References Cited
UNITED STATES PATENTS
3,481,860 12/1969 Borst........................... 208/108

Primary Examiner—Delbert E. Gantz
Assistant Examiner—R. M. Bruskin
Attorneys—James R. Hoatson, Jr. and Joseph C. Mason, Jr.

ABSTRACT: Hydrogen is recovered from a normally liquid hydrocarbon fraction produced by the catalytic hydroprocessing of a petroleum crude oil feedstock utilizing a hot separator liquid stripping zone and high pressure superheated steam as the stripping medium.

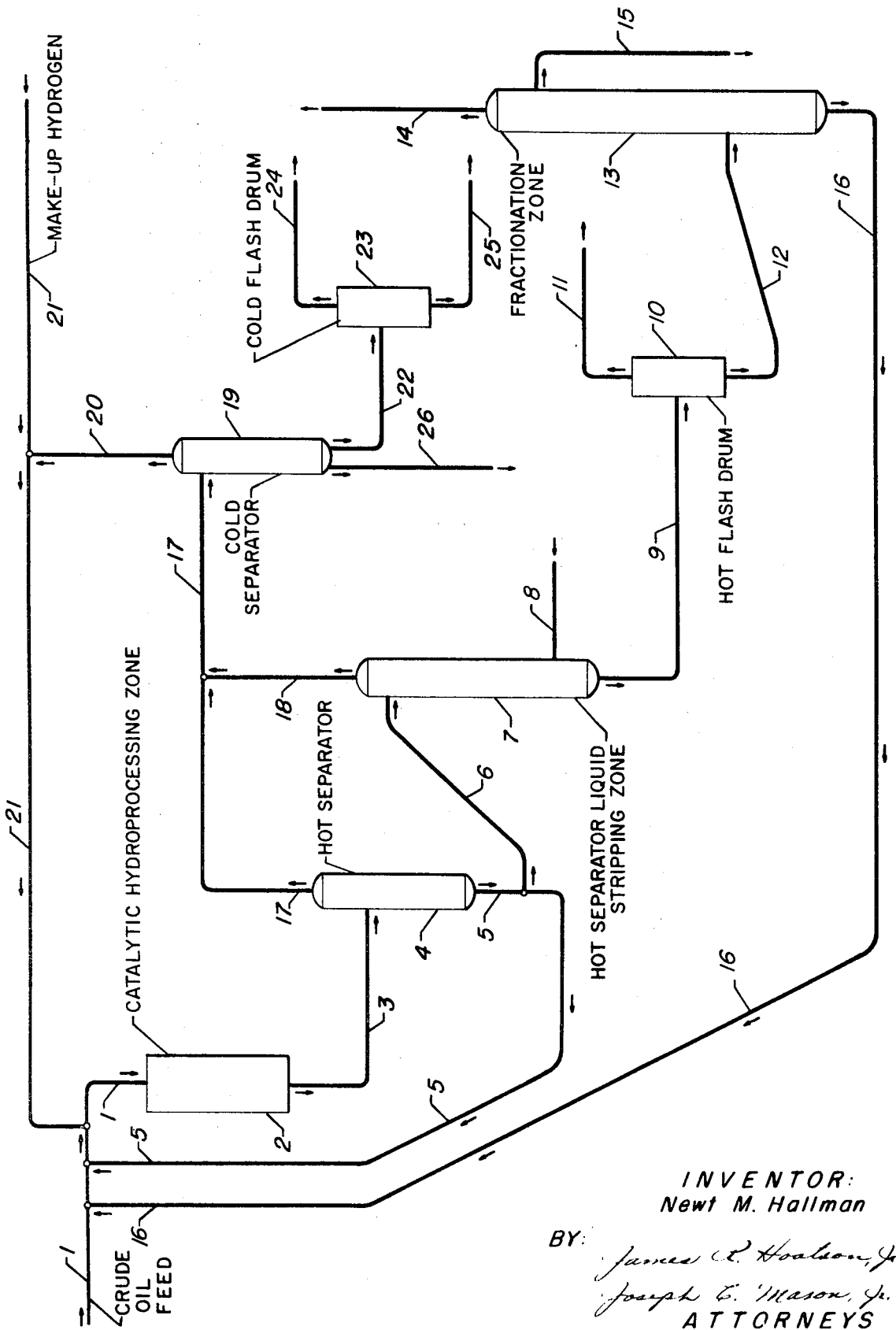

RECOVERY OF HYDROGEN

BACKGROUND OF THE INVENTION

This invention relates to a method for the recovery of hydrogen from a normally liquid hydrocarbon fraction produced by the catalytic hydroprocessing of a petroleum crude oil feedstock. This invention specifically relates to a method for the recovery of hydrogen for a normally liquid hydrocarbon fraction produced by the catalytic hydroprocessing of a petroleum crude oil feedstock utilizing a hot separator liquid stripping zone and high pressure superheated steamed as the stripping medium.

In high pressure processes that consume or produce hydrogen, some hydrogen is normally found in the liquid products by having been either equilibrium present or entrained in the liquid product. My invention is a method of recovering this hydrogen so contained by less expensive capital and operating means than would be conventionally employed.

By the term "catalytic hydroprocessing" I means to include any processing of a petroleum fraction under elevated hydrogen pressure involving a consumption of hydrogen by the petroleum fraction. This naturally includes hydrocracking, hydrotreating, and hydrorefining or hydropurification.

In typical prior art processes, hydrogen is lost from the process in the liquid from the hot separator and the cold separator that usually follows the catalytic hydroprocessing zone. This hydrogen gas usually end up in the hot flash gas condensate drum and the cold flash condensate drum. These gases can be recovered and reused by compression or else burned as fuel or they could be used, after clean up, as charge to a hydrogen manufacturing unit. However, I have found that in my method, hydrogen in the hot separator liquid is preferentially stripped with superheated steam as the stripping medium in a vessel called the hot separator liquid stripping zone. As a further benefit of my method, the hydrogen recovered is available at substantially the required pressure for use in the catalytic hydroprocessing zone.

SUMMARY OF THE INVENTION

It is an object of this invention to provide a method for the recovery of hydrogen from a normally liquid hydrocarbon fraction produced by the catalytic hydroprocessing of a petroleum crude oil feedstock.

It is a further object of this invention to provide a method for the recovery of high pressure hydrogen from a normally liquid hydrocarbon fraction produced by the catalytic hydroprocessing of a petroleum crude oil feedstock.

Therefore, the present invention provides a method for the recovery of hydrogen from a normally liquid hydrocarbon fraction produced by the catalytic hydroprocessing of petroleum crude oil feedstock which comprises: (a) introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons and normally liquid hydrocarbons; (b) passing said effluent stream into a separation zone wherein said stream is separated into a hydrogen rich gaseous hydrocarbon fraction, normally gaseous components, a normally gaseous hydrocarbon fraction, and a normally liquid hydrocarbon fraction; (c) passing a portion of said normally liquid hydrocarbon fraction into a stripping zone maintained under stripping conditions wherein said fraction is contracted with high pressure superheated steam to preferentially strip hydrogen from said fraction; (d) passing said hydrogen of Step (c) in admixture with said hydrogen-rich gaseous fraction of Step (b) to admix with the remaining portion of said normally liquid hydrocarbon fraction of step (b) prior to returning into said catalytic hydroprocessing zone of Step (a); (e) passing a substantially hydrogen-free normally liquid hydrocarbon fraction from said stripping zone to a fractionation zone; and, (f) recovering the normally liquid hydrocarbons of Step a As will be described hereinafter in greater detail, the essence of my invention encompasses the preferential stripping of hydrogen from a normally liquid hydrocarbon fraction produced by the catalytic hydroprocessing of a petroleum crude oil feedstock.

The term "petroleum crude oil feedstock" is meant to include any oils extracted from tar sands, topped or reduced crudes, vacuum residuum (vacuum tower bottoms products) and those petroleum crude oils referred to as "black oils" which contain a significant quantity of asphaltic material and high concentrations of sulfur, as well as large quantities of nitrogenous compounds and high molecular weight organometallic complexes principally comprising nickel and vanadium. these "black oils" include those hydrocarbon charge stocks of which at least about 10 percent by volume boils above a temperature of about 1050° F. These black oils usually have an API gravity, at 60° F., of less than 20.0 and further, sulfur concentrations are usually more than 1 percent by weight and often in excess of 3 percent by weight.

As set forth hereinabove, this invention relates to a method for the recovery of hydrogen from a normally liquid hydrocarbon fraction produced by the catalytic hydroprocessing of a petroleum crude oil feedstock. Many catalysts are suitable for the catalytic hydroprocessing of a petroleum crude oil feedstock. A particularly preferred catalytic hydroprocessing catalyst which may be utilized in the method of the present invention can be characterized as comprising a metallic component possessing hydrogenation activity, which component is composited with a refractory inorganic oxide carrier material which may be of either synthetic or natural origin. The precise composition and method of manufacturing the catalytic composition is not considered to be an essential element of the present method.

However, a particularly suitable catalyst for use of my invention would comprise a refractory inorganic oxide carrier material such as alumina, silica, zirconia, magnesia, titania, boria, strontia, hafnia, etc., and mixtures thereof including silica-alumina, silica-zirconia, silica-magnesia, silica-titania, alumina-zirconia, silica-alumina-boron phosphate, alumina-magnesia, alumina-titania, magnesia-zirconia, titania-zirconia, magnesia-titania, silica-alumina-zirconia, silica-alumina-magnesia, silica-alumina-titania, silica-magnesia-zirconia, silica-alumina-boria, etc. It is preferred to utilize a carrier material containing at least a portion of silica, and it is particularly preferred to utilize a composite of alumina and silica. Suitable metallic components for hydrogenation activity are those selected from the group consisting of the metals of Groups VI-B and VIII of the Periodic Table. Thus, the catalytic composition may comprise one or more metallic components selected from the group consisting of molybdenum, tungsten, chromium, iron, cobalt, nickel, platinum, palladium, iridium, osmium, rhodium, ruthenium, and mixtures thereof. The concentration of the catalytically active metallic component or components is primarily dependent upon the particular metal utilized as well as the characteristics of the charge stock. The Group VI-B metal, such as chromium molybdenum, or tungsten is usually preferred in an amount of from about 0.5 percent to about 10 percent by weight of the catalyst. Group VIII metals, which may be divided into two subgroups, namely the iron subgroup and the noble metal subgroup, are preferred in an amount of from about 0.1 percent to 10.0 percent by weight of the total catalyst. When an iron subgroup metal such as iron, cobalt, or nickel, etc. is employed, it is preferred in an amount from about 0.2 percent to about 10.0 percent by weight. When a noble metal employed; metal such as platinum, palladium, or iridium, etc., is employed, it is preferred to utilize an amount within the range of from about 0.1 percent to about 5.0 percent by weight of the total catalyst.

When utilizing catalytic hydroprocessing catalyst such as described above, the catalytic hydroprocessing zone containing the catalyst is usually maintained under catalytic hydroprocessing conditions including a temperature of from about 600° F. to about 1,000° F. as measured at the inlet to the fixed bed of catalyst disposed within the reaction zone and preferably at a temperature of about greater than 700° F. The catalytic hydroprocessing zone is maintained at a selected operating pressure which is usually maintained at about 1,000 p.s.i.g. and preferably in the range of from about 1,000 to 4,000 p.s.i.g. Hydrogen is passed to the catalytic hydroprocessing zone in an amount of from about 2,000 to 40,000 SCF/bbl. and preferably of from about 2,000 to 20,000 SCR/bbl. at the selected operating pressure. The liquid hourly space velocity (being defined as the volume of liquid hydrocarbon charge per hour per volume of catalyst disclosed within the reaction zone) is maintained in the range of from about 0.25 to about 4.0.

The first separation zone is usually referred to as a hot separator and is usually maintained at substantially the same pressure imposed upon the catalytic hydroprocessing zone. The first separation zone is maintained usually at a temperature of from about 700° F. to about 750° F.

The hot separator liquid stripping zone is usually maintained at substantially the operating pressure of the catalytic hydroprocessing zone also. This stripping zone is maintained under stripping conditions so that high pressure superheated steam may preferentially strip hydrogen from a liquid hydrocarbon fraction charged to the stripping zone. The stripping zone may contain trays, baffles and the like and usually the liquid hydrocarbon fraction is passed countercurrently to the high pressure superheated steam stripping medium.

The second separation zone is usually referred to as a cold separator and is maintained at a temperature below about 700° F. and is also at substantially the same operating pressure as the catalytic hydroprocessing zone.

The flash zones utilized in my method are usually referred to as a clod flash system and a hot flash system. The cold flash system follows the cold separator and is maintained at substantially reduced pressures usually in the range from about subatmospheric to about 1,000 p.s.i.g. and preferably from about subatmospheric pressure to about 100 p.s.i.g. The hot flash system is maintained at essentially the same pressure as the cold flash system as described above. As the names of these systems indicate, the hot flash system is maintained at higher temperatures than the cold flash system.

The fractionation zone utilized in my method may be of a conventional type and is utilized for obtaining the normally liquid hydrocarbon products from the catalytic hydroprocessing reaction. The fractionation zone may be a series of fractional distillation columns including vacuum distillation columns and the fractionation zone may provide recycle back to the catalytic hydroprocessing zone with any one of a number of recycle streams or may be utilized strictly for the recovery of all the liquid products.

My invention can be most clearly described and illustrated with reference to the attached drawing which is a schematic representation of one specific embodiment of the invention.

DESCRIPTION OF THE DRAWING

Referring now to the drawing, a petroleum crude oil feedstock is passed via line 1 to catalytic hydroprocessing zone 2 wherein a catalytic hydroprocessing catalyst, as described above, is disposed therein. The reaction zone may be equipped with heat transfer means, baffles, trays, heating means, etc. The reaction zone is preferably of the adiabatic type and thus feed to the reaction zone will preferably be provided with the requisite amount of heat prior to passage thereof to said reaction zone. The actual operation of the reaction zone may be upflow, downflow, or radial flow. At the end of the desired residence time in the reactor, an effluent stream is removed from the catalytic hydroprocessing zone 2 via line 3 for passage to hot separator 4. The effluent stream contains unreacted hydrogen gas, normally gaseous components, normally gaseous hydrocarbons, and normally liquid hydrocarbons.

In hot separator 4, the effluent is separated into an unreacted hydrogen gas fraction, normally gaseous components including sulfur containing compounds and ammonia containing compounds. The normally liquid hydrocarbon fraction is withdrawn from separator 4 via line 5 and a portion via line 6 of this fraction is passed into hot separator liquid stripping zone 7 wherein the fraction is contacted with high pressure superheated steam via line 8 to preferentially strip hydrogen from the fraction.

The high pressure hydrogen recovered in hot separator liquid stripping zone 7 is then passed via line 18 to admix with unreacted hydrogen separated in separator 4 in line 17 to pass to the second separation zone shown as cold separator 19. In cold separator 19, the hydrogen rich gas fraction is separated from the normally gaseous components and normally gaseous hydrocarbon fraction and steam condensate is also removed. In the drawing, the hydrogen-rich gas fraction is shown to be removed from separator 19 via line 20 which passes to admixture in line 21 with makeup hydrogen supplied to the process. The hydrogen-rich gas fraction is subsequently admixed with the remaining portion of the normally liquid hydrocarbon fraction removed in hot separator 4 which passes via line 5 to a commingling step in line 1 wherein the hydrogen-rich fraction including makeup hydrogen in line 21 admixes with the normally liquid hydrocarbon via line 5 and the total admixture passes via line 1 to the catalytic hydroprocessing zone.

The normally gaseous components and normally gaseous hydrocarbon fraction separated in separator 19 is passed via line 22 to cold flash drum 23 wherein the normally gaseous components are separated from the normally gaseous hydrocarbons. Lines 24 and 25 represent the separated streams. These components recovered via lines 24 and 25 may be discarded or passed to other vessels, not shown, for further use in my process. A recycle liquid from the cold flash drum to the cold separator may be present to increase the percent hydrogen in line 20.

From hot separator liquid stripping zone 7, a substantially hydrogen-free normally liquid hydrocarbon fraction is removed and passed via line 9 to hot flash drum 10 which is maintained at substantially reduced pressure to further remove any gaseous components entrained in the normally liquid hydrocarbon fraction. These gaseous components are removed from the process via line 11. The hydrogen-free normally liquid hydrocarbon fraction is then passed from flash zone 10 via line 12 to fractionation zone 13 which may be a series of conventional fractional distillation columns including vacuum distillation columns. In fractionation zone 13, desired products are removed from the process via lines 14 and 15 and are subsequently recovered. A heavy bottoms fraction may be removed from fractionation zone 13 and passed via line 16 to admix with the petroleum crude oil feedstock in line 1 for recycle to the catalytic hydroprocessing zone.

In this manner, the high purity hydrogen normally found in the liquid products from a catalytic hydroprocessing reaction is recovered for immediate reuse by the utilization of my method. In addition, the hydrogen recovered is at substantially the same operating pressure as the catalytic hydroprocessing zone so that additional compressor costs and additional hardware is not needed in my method.

It is to be understood throughout the entire discussion of my invention, that the references to substantially the same operating pressure of the catalytic hydroprocessing zone refers and is intended to connote that pressure drop only as a result of the flow of fluids through the typical catalytic hydroprocessing unit is the reason for slightly lower pressures being present in subsequent vessels in the flow scheme. No specific intentional means has been employed to reduce this pressure.

PREFERRED EMBODIMENT

In a particularly preferred embodiment of this invention, this invention provides a method for the recovery of hydrogen from a normally liquid hydrocarbon fraction produced by the catalytic hydroprocessing of a petroleum crude oil feedstock, which comprises: (a) introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons; (b) passing said effluent stream into a first separation zone wherein said stream is separated at a temperature from about 700° F. to about 750° F. and at substantially the catalytic hydroprocessing zone operating pressure into an unreacted hydrogen gas fraction, normally gaseous components, normally gaseous hydrocarbon fraction, and a normally liquid hydrocarbon fraction; (c) passing a portion of said normally liquid hydrocarbon fraction into a stripping zone maintained under stripping conditions wherein said fraction is contacted with high pressure superheated steam to preferentially strip hydrogen from said fraction; (d) passing said hydrogen of Step (c) in admixture with said unreacted hydrogen fraction, said normally gaseous components, and normally gaseous hydrocarbon fraction of Step (b) to a second separation zone maintained at a temperature below about 700° F. and at substantially the catalytic hydroprocessing zone operating pressure wherein a hydrogen-rich gas fraction is separated from said normally gaseous components and said normally gaseous hydrocarbon fraction; (e) passing said hydrogen-rich gas fraction of Step (d) to admix with the remaining portion of said normally liquid hydrocarbon fraction of Step (b) prior to returning it to said catalytic hydroprocessing zone of Step (a); (f) passing said normally gaseous components and normally gaseous hydrocarbon fraction of Step (d) to a first flash zone maintained at a substantially reduced pressure wherein said normally gaseous components are separated from said normally gaseous hydrocarbons; (g) passing a substantially hydrogen-free normally liquid hydrocarbon fraction from Step (c) to a second flash zone maintained at a substantially reduced pressure prior to passage to a fractionation zone; and, (h) recovering the normally liquid hydrocarbons of Step (a).

Thus, it can be seen that the present invention provides a method for the recovery of hydrogen from a normally liquid hydrocarbon fraction produced by the catalytic hydroprocessing of a petroleum cured oil feedstock utilizing an interrelated and interdependent series of processing steps to accomplish the recovery in a manner eliminating extraneous process hardware such as compressors and the like and obtaining maximum utilization of the existing hydrogen in the process at elevated pressures.

I claim:

1. A method for the recovery of hydrogen from a normally liquid hydrocarbon fraction produced by the catalytic hydroprocessing of a petroleum crude oil feedstock which comprises the steps of:
   a. introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons;
   b. passing said effluent stream into a separation zone wherein said stream is separated into a hydrogen-rich gaseous hydrocarbon fraction, normally gaseous components, a normally gaseous hydrocarbon fraction, and a normally liquid hydrocarbon fraction;
   c. introducing a portion of said normally liquid hydrocarbon fraction into a stripping zone maintained under stripping conditions and therein passing said fraction in countercurrent contact with a separate stream of high pressure superheated steam to preferentially strip hydrogen from said fraction;
   d. passing said hydrogen of Step (c) in admixture with said hydrogen-rich gaseous fraction of Step (b) to admix with the remaining portion of said normally liquid hydrocarbon fraction of Step (b) and returning the resultant mixture to said catalytic hydroprocessing zone of Step (a);
   e. passing a substantially hydrogen-free normally liquid hydrocarbon fraction from said stripping zone to a fractionation zone; and,
   f. recovering the normally liquid hydrocarbons of Step (a).

2. The method according to claim 1 wherein said petroleum crude oil feedstock is admixed with makeup hydrogen prior to passing to said catalytic hydroprocessing zone.

3. The method according to claim 1 wherein said catalytic hydroprocessing conditions include a temperature above about 600° F. and a pressure above about 1,000 p.s.i.g. and wherein said stripping conditions include substantially the same pressure imposed upon said catalytic hydroprocessing zone.

4. The method according to claim 1 wherein a heavy liquid hydrocarbon faction from said fractionation zone of Step (e) is recycled and admixed with said petroleum crude oil feedstock.

5. A method for the recovery of hydrogen from a normally liquid hydrocarbon fraction produced by the catalytic hydroprocessing of a petroleum crude oil feedstock which comprises the steps of:
   a. introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons;
   b. passing said effluent stream into a first separation zone wherein said stream is separated at a temperature form about 700° F. to about 750° F. and at substantially the catalytic hydroprocessing zone operating pressure into an unreacted hydrogen gas fraction, normally gaseous components, a normally gaseous hydrocarbon fraction, and a normally liquid hydrocarbon fraction;
   c. introducing a portion of said normally liquid hydrocarbon fraction into a stripping zone maintained under stripping conditions and therein passing said fraction in countercurrent contact with a separate stream of high pressure superheated steam to preferentially strip hydrogen from said fraction;
   d. passing said hydrogen of Step (c) in admixture with said unreacted hydrogen fraction, said normally gaseous components, and said normally gaseous hydrocarbon fraction of Step (b) to a second separation zone maintained at a temperature below about 700° F. and at substantially the catalytic hydroprocessing zone operating pressure wherein a hydrogen-rich gas fraction is separated from said normally gaseous components and said normally gaseous hydrocarbon fraction;
   e. passing said hydrogen-rich gas fraction of Step (d) to admix with the remaining portion of said normally liquid hydrocarbon fraction of Step (b) and returning the resultant mixture to said catalytic hydroprocessing zone of step (a);
   f. passing said normally gaseous components and normally gaseous hydrocarbon fraction of Step (d) to a flash zone maintained at a substantially reduced pressure wherein said normally gaseous components are separated from said normally gaseous hydrocarbons;
   g. passing a substantially hydrogen-free normally liquid hydrocarbon fraction from Step (c) to a second flash zone maintained at a substantially reduced pressure and then to a fractionation zone; and,
   h. recovering the normally liquid hydrocarbons of Step (a).

6. The method according to claim 5 wherein said petroleum crude oil feedstock is admixed with makeup hydrogen prior to passing to said catalytic hydroprocessing zone.

7. The method according to claim 5 wherein said catalytic hydroprocessing conditions include a temperature above about 700° F. and a pressure above about 1,000 p.s.i.g. and wherein said stripping conditions include substantially the same pressure imposed upon said catalytic hydroprocessing zone.

8. The method according to claim 5 wherein a heavy liquid hydrocarbon fraction from said fractionation zone of step (g) is recycled and admixed with said petroleum crude oil feedstock.